APPARATUS FOR INTERRECORD GAP SIZE CONTROL

Filed June 28, 1963 3 Sheets-Sheet 1

INVENTORS
ROBERT V. McFADDEN
CHARLES P. RAUF
GILBERT G. UNGER
BY Bernard M. Goldman
ATTORNEY 3,364,495
APPARATUS FOR INTERRECORD GAP SIZE CONTROL

Robert V. McFadden, Wappingers Falls, and Charles P. Rauf and Gilbert G. Unger, Poughkeepsie, N.Y., assignors to the International Business Machines Corporation, New York, N.Y., a corporation of New York
Filed June 28, 1963, Ser. No. 291,359
6 Claims. (Cl. 346—74)

This invention relates to the coordination of writing tape data blocks with a high speed program-operated computer. In particular this invention relates to interrecord gap size control, using a statistical likelihood that a series of computer write instructions will be provided to the same tape unit, and that each next instruction in the sequence will occur within a short period of time after execution of the prior write instruction. Under such conditions, this invention can obtain a series of relatively small and uniform interrecord gaps to improve the access time to the next block in sequence.

Prior tape systems generally suffer substantial interrecord gap size variation as a function of when the next write instruction occurs after completing the prior data block. This time interval is called herein reinstruct time.

Prior systems generally dropped the capstan actuation signal (called the tape Go signal) as soon as the prior instruction was completed at the end of a block, and the Go signal was not brought up again until the next instruction was received. In such case, the Go signal is down during the reinstruct time. Since variation in the reinstruct time is arbitrary as a function of the computer program operating the tape drive, the time that the Go signal is down is likewise arbitrary.

Variations in the reinstruct time affected the mechanical operating characteristics of the capstan actuator, which affected tape deceleration and acceleration properties. The mechanical inertia of the capstan actuator prevented it from responding as quickly as the electrical Go signal could be controlled. Furthermore mechanical vibratory effects to the capstan actuator could result from particular values of reinstruct time.

Prior systems generally used only a single write delay. If the reinstruction occurred very quickly after the end of the prior block (before the tape could slow down), a longer interrecord gap resulted than was needed. This wasted access time to the next block and lowered information capacity of the tape. On the other hand, at intermediate values of reinstruct time, varying amounts of tape deceleration occurred before acceleration would begin, and considerable variation occurred to the interrecord gap size in a rather erratic manner during the write delay. For long reinstruct times, a nominal interrecord gap was generally obtained, since the deceleration was long enough to stop the tape before it was again accelerated in response to a new instruction.

It is therefore the principle object of this invention to control interrecord gaps size within tolerable limits when writing tape and to improve the access time to the next record when the reinstruction occurs within a specific period of time. For example, if the access time per data block is shortened by one millisecond, then one-half minute of system time may be saved in reading a reel of tape having 30,000 blocks.

This invention permits the Go signal to drop automatically at the end of execution of each write command (generally when the read checking is completed for a block). If a write command occurs within a short period of time, A, a short write delay is generated. This short write delay can be used in conjunction with a long write delay if the instruction comes up after the short period A, or it can be used with an inhibition of the long write delay for a specific period after termination of the period A in order to obtain more uniform interrecord gap sizes at the expense of access time when the reinstruct period is greater than A.

The foregoing and other objects, features and advantages of the invention will be apparent from the following more particular description of the preferred embodiment of the invention, as illustrated in the accompanying drawings.

In the drawings:

FIGURES 1, 2, and 3 illustrate an embodiment of the invention;

Computer systems can operate electronically in a relatively few microseconds to transfer data, but generally mechanical input-output systems require milliseconds to respond initially. Consequently, it is highly desirable for a mechanical I/O system, such as a tape unit to be able to initially respond with data as quickly as possible. Once the initial mechanical inertia has been overcome, the data output rate from the tape can often match the computer rate as long as a block is being read or written. But even though tape is moving at full speed, time is lost in moving across the separation between data blocks, known as the interrecord gap (IRG), which however must be provided if the computer should ever want to stop the tape after reading or writing any block and not immediately read or write the next block. Thus the quickest access to the next data block is by not having the tape drive stop (or even slow down) while the heads are crossing an interrecord gap. But even in this case for example, over five milli-seconds of access time may be needed for the heads to pass across the interrecord gap to the next block. The computer system in some cases remains idle during this time, or it may utilize complex programming in order to go to some other task during the interval. Accordingly, the full-speed access time to the next block is directly proportional to the size of the interrecord gap (IRG).

It is extremely difficult to maintain a minimum size interrecord gap under all operating conditions. The problem is complicated by computer operating conditions which can require: (1) the tape to stop in the IRG after writing a block and to restart in order to write the next block, or (2) maintain full tape speed across the IRG, or (3) to have the tape slow down in the IRG before accelerating it to write the next block when the computer signals a new writing operation after an intermediate reinstruct time.

In particular the problem is made difficult in that the computer instruction to write the next block can occur randomly with respect to the completion of the prior block. Thus on the one hand the computer may respond with a reinstruction almost immediately after the prior block is completed, such as in microseconds; or on the other hand, computer may not respond for a substantially long period of time such as many minutes or hours. Generally it is not difficult to design programs which require the computer to respond with most reinstructions within about half a millisecond after completion of wiring or reading a prior tape block.

Figure 5:
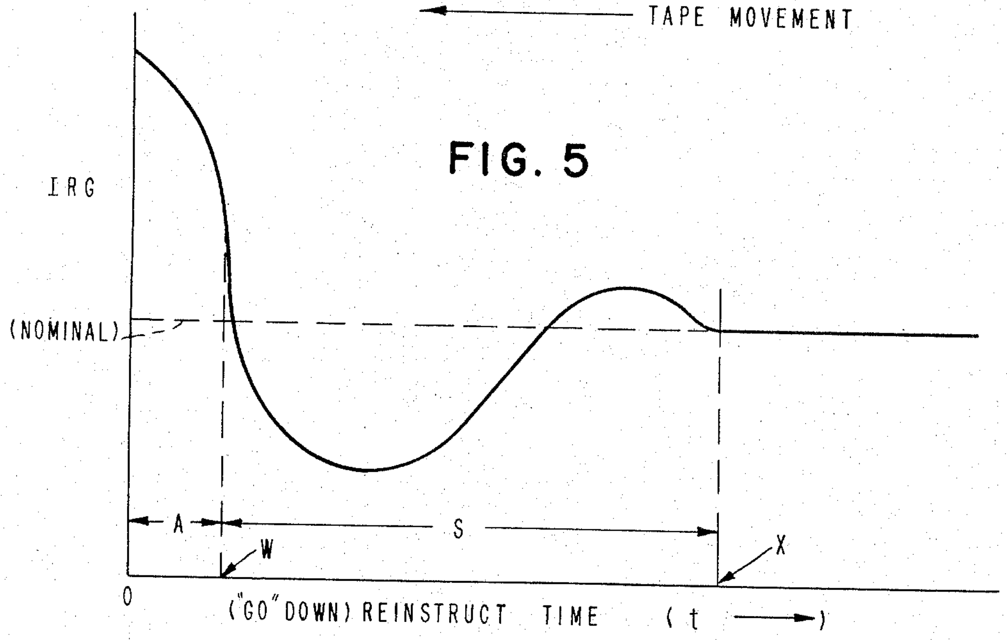
FIGURE 5 shows a curve relating interrecord gap size with reinstruct time.

FIGURE 5 shows how the size of the interrecord gap can vary with different reinstruct times in prior systems using a single fixed write delay. It is seen that when the reinstruct time is very short (less than W), a very large interrecord gap size can occur because the tape has not slowed and maximum tape velocity is maintained over the entire write delay period. On the other hand, when reinstruct time is long (greater than X), a constant interrecord gap is obtained since the tape has had time to stop, and it obtains the same acceleration cycle during every write delay following a halt. On the other hand, between reinstruct period lengths, W and X, the interrecord gap varies considerably due to the tape starting its acceleration at varying points in its deceleration, and also due to resulting vibratory characteristics of the capstan actuator. In the case of one tape drive, the value of W is about 0.5 millisecond, and the value of X is about 4.0 milliseconds.

Figure 1:
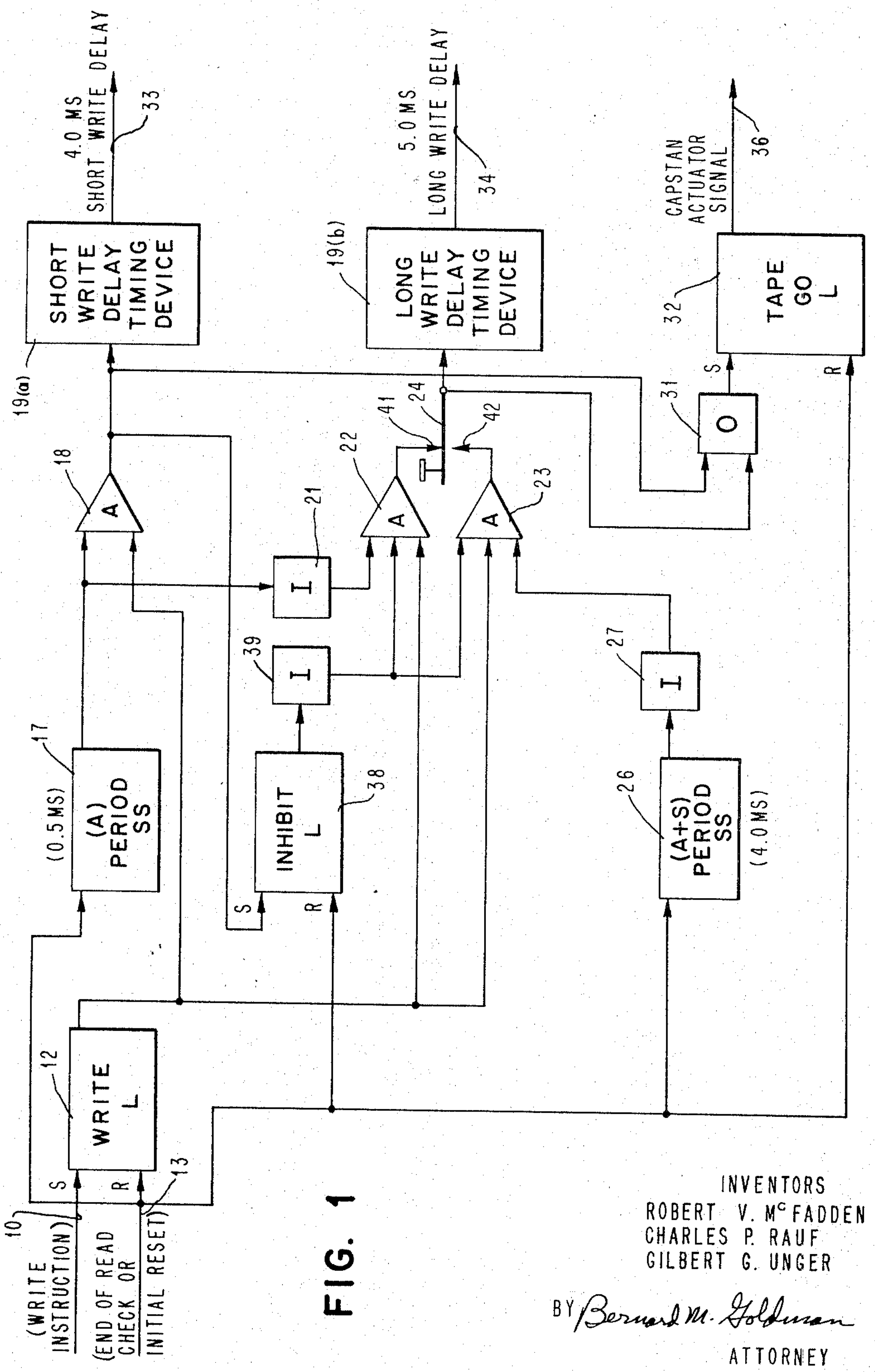

FIGURE 1 illustrates an embodiment of this invention. It includes an input line 10 on which a write instruction pulse is received. The write instruction sets a write latch 12, and it is reset by a pulse on lead 13. Latch 12 is reset initially at the start of machine operation, and it is again reset at the completion of each written tape block in the manner well known in the art by a signal indicating the end of the read check (which occurs after monitoring read heads have cleared the end of the newly written block).

Figure 4:
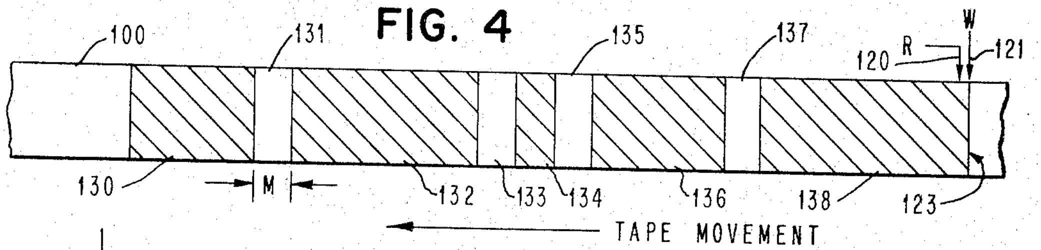
FIGURE 4 shows a tape having data blocks recorded thereon with interrecord gaps intervening among them.

A single-shot 17 is actuated by the end read check pulse on lead 13. Thereafter, single-shot 17 provides an output for a period of about 0.5 millisecond while it is actuated. (If a read check is not done while writing a block, then single-shot 17 is instead actuated by the write disconnect signal. However, this embodiment presumes a read check is done by read heads following the write heads, such as 120 and 121 in FIGURE 4.)

A tape Go latch 32 is also reset at the end of each block and thereby brings down the capstan actuator signal on a lead 36. When the signal is brought down, a brake is applied to stop the tape. However the tape does not instantly stop, but decelerates over a period of a few milliseconds before it comes to a stop.

Figures 2, 3:
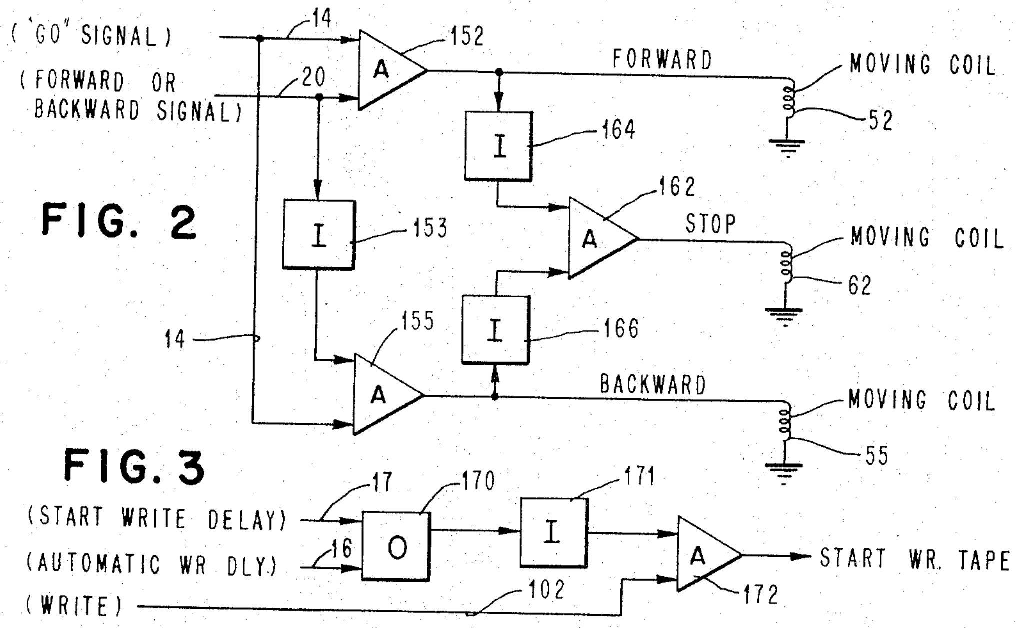

An AND gate 18 has one input connected to the output of single-shot 17, and has another input receiving the output of write latch 12. Thus gate 18 provides an output only if a new write instruction occurs within one-half millisecond after the end of the prior block. When gate 18 provides an output it passes through OR circuit 31 to set Go latch 32 and continue tape movement which has not substantially decelerated during the 0.5 millisecond period. Also the output of gate 18 actuates a short write delay timing device 19(*a*). Device 19(*a*) may, for example, be a single-shot or a timing clock of conventional type. Its output provides a signal for the short write delay time, which might be 4.0 milliseconds. Its output line 33 is provided to an OR circuit 170 in FIGURE 3. An inverter 171 passes the output of circuit 170 to an input of an AND gate 172 which has another input received from the output of write latch 12. Thus gate 172 provides an output only at the end of the write delay, when writing starts for the next data block on tape.

A second AND gate 22 receives the inverted output of single-shot 17 and the output of write latch 12. Thus gate 22 can provide an output only if a write instruction occurs after 0.5 millisecond, period A of single-shot 17. When a switch 24 is in the illustrated position 41, the output of AND gate 22 actuates a long write delay timing device 19(*b*); and simultaneously sets Go latch 32. Timing device 19(*b*) may be a single-shot providing a delay time of, for example, 5.0 milliseconds, or device 19(*b*) may be a clock of the same nature as 19(*a*). The output of device 19(*b*) is provided to a lead 34, which also goes to OR gate 170 in FIGURE 3, so that writing cannot start until the end of the long write delay.

However, it is necessary that timing device 19(*b*) be inhibited from providing any long delay, if previously a short delay was provided from device 19(*a*). For this purpose, an inhibit latch 38 is provided which is set by the output of AND gate 18. When set, its output is provided through an inverter 39 to AND gate 22 to block it. Thus AND gate 22 is blocked by latch 38 whenever a short write delay is provided; and no long write delay can then be obtained until after the end of the block, when latch 38 is reset by a pulse on line 13. The result of the circuit thus far described for FIGURE 1 is to reduce the IRG size and shorten the access time to the next block for reinstruct times less than 0.5 millisecond.

When it is desired to eliminate interrecord gap variation for reinstruct times between W and X in FIGURE 5, switch 24 is positioned at contact 42; and a single-shot 26 is provided. The output period $(A+S)$ of single-shot 26 is approximately equal to reinstruct time X in FIGURE 5, which for example may be 4.0 milliseconds. Single-shot 26 is also actuated by the end-of-block signal on lead 13. The output of single-shot 26 is provided through an inverter 27 to block an AND gate 23, which receives the set output of write latch 12. Since switch 24 is in position 42, only AND gate 23 can be utilized to actuate long write delay device 19(*b*). Another input to AND gate 23 receives the output from inhibit latch 38, and therefore gate 23 will be inhibited if a short write delay is provided by a reinstruct within the 0.5 millisecond initial period A. However, if an instruction is not provided until after initial period A, it is not effective on the tape until after the expiration of the period $A+S$ of single-shot 26. This is because the inverted output of single-shot 26 blocks AND gate 23 until the expiration of the 4.0 millisecond period after the end of the prior block. Accordingly, an instruction occurring after the 0.5 millisecond period A will prevent AND gate 23 from passing the set output from write latch 12 until the end of the 4.0 millisecond period. Then the output of AND gate 23 can pass through switch 24 to actuate the long write delay and provide an output on lead 34 to OR gate 170 in FIGURE 3.

Go latch 32 is set at the beginning of any short or long write delay. Thus an output from gate 18 goes through OR gate 31 to set latch 32 when a short write delay occurs within period A. When switch 24 is in position 41, latch 32 is set when an instruction is received after 0.5 millisecond. On the other hand, when switch 24 is at position 42, then a tape Go latch 32 can only be set before the end of period A and after the expiration of period $(A+S)$, but cannot be set during period S.

Figure 6:
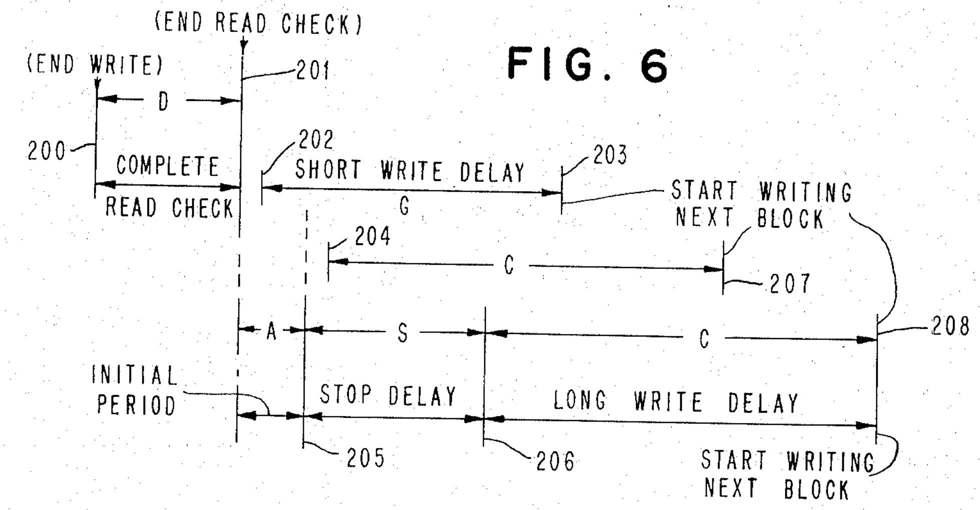
FIGURE 6 represents basic timing characteristics of the invention.

FIGURE 6 represents examples of time operating characteristics for the embodiment in FIGURE 1. Time 201 represents the instant that a pulse is provided on 13 to represent the end of a read check, which signifies the end of a tape block write operation, since the writing is not considered over until it has been checked by a monitoring read head. If there is no monitoring read operation following a write operation, then the pulse on line 13 would be provided when the write heads complete writing a block. However, in the commonly used situation a read head simultaneously monitors after a write head; then time instant 201 in FIGURE 6 represents the instant that the write head has just completed writing the last data in the block. Initial period A is started at time 201. A short write delay may be initiated at any time instant 202 within period A by a write instruction then occurring. Thus in FIGURE 6 a short write delay G is provided beginning at time instant 202 and ending at time instant 203, which is the function of AND gate 18 and timing device 19(*a*).

On the other hand, if a new write instruction does not occur within the period A, but occurs thereafter at instant 204 within period S with switch 24 at position 41, a long write delay C is enabled by the write instruction occurring at time 204, and the long delay expires at time 207.

However, if switch 24 is at position 42, no new instruction during period S can start a write delay. Instead stop delay S begins at time instant 205. No write delay can begin during period S. If a write instruction occurs during period S which sets trigger 12, then the operation of AND gate 23 is such that the long write delay period C begins at instant 206 at the end of stop delay S. Then tape starts at time 206 and writing begins at time 208. If the write instruction does not occur until after stop delay S, the tape movement and the long write delay do not begin until the occurrence of such write instruction.

Figure 7:
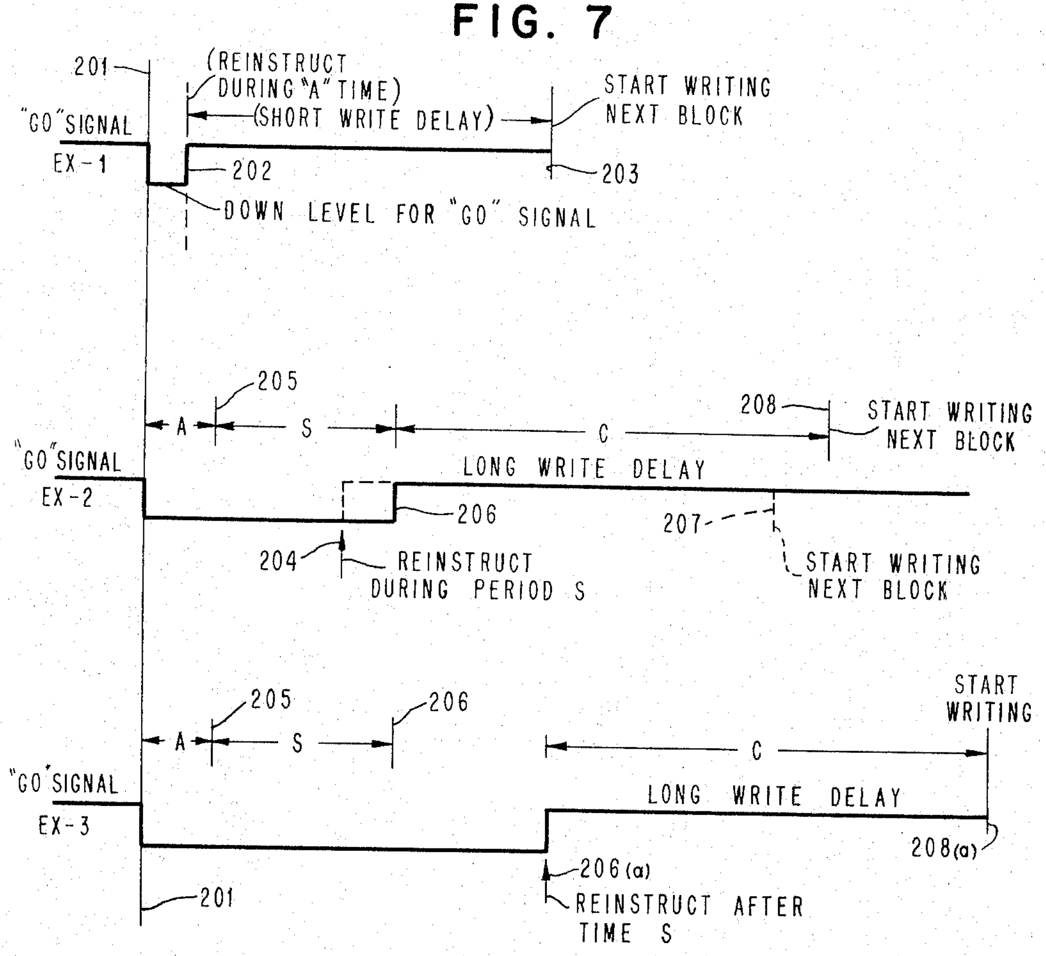
FIGURE 7 shows waveforms of operating examples of the invention.

FIGURE 7 illustrates the manner in which tape Go latch 32 is actuated under varying reinstruct time conditions. In every example, the tape Go latch 32 is reset by the pulse at time 201 at the end of read check. Accordingly, the three examples in FIGURE 7 vary by illustrating the effect of different reinstruct times.

In Example 1, the next instruction occurs during period A at time instant 202. This sets tape Go latch 32 and brings up its output level at this time; and the short write delay begins simultaneously.

In Example 2 of FIGURE 7, a next write instruction occurs at time 204, which is after period A. The dashed lines adjacent to arrow 204 illustrate the operation of tape Go latch 32 when the switch 24 is set to position 41. In this case, latch 32 is set by the occurrence of the instruction at time 204 and the long write delay is then commenced and is complete at time 207 when writing starts for the next block. On the other hand if switch 24 is at position 42 when the next instruction occurs at time 204 in Example 2, then the Go latch must remain down until the end of time period S because of the operation of single-shot 26. Accordingly, the Go signal comes up at time 206 to simultaneously start tape and the long write delay which expires at time 208 when writing starts for the next block.

In Example 3, a next write instruction comes up after period S. In this case it makes no difference whether switch 24 is at position 41 or 42 because the tape Go latch 32 will be set at the same time by either AND gate 22 or 23 since single-shot 26 has completed its timeout by this time. Thus the instruction comes up at time 206(*a*) which is after time instant 206 to bring up the Go signal at time 206(*a*) and simultaneously begin the long write delay period C which ends at time 208(*a*), which is after time 208.

Accordingly, it can be seen in FIGURE 7 that the effect of the two positions for switch 24 is significant only in Example 2 for the condition of a next write instruction occurring during period S. With position 41 utilized, the access time is less for beginning the writing of the next block; but with position 42 utilized, the interrecord gap is made more uniform as explained previously with respect to FIGURE 5.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. Means for controlling the writing of a next tape block of digital information in relation to a prior adjacent tape block on magnetic tape, comprising means for providing a short-write time delay and a long-write time delay for use while moving said tape prior to writing the next tape block, means for measuring an interval of time related to the end of writing said prior adjacent tape block, means for signaling the writing of the next tape block, means for actuating said short-write delay in response to the next tape write signal occurring within said interval of time, and means for actuating said long write delay in response to the next tape write signal occurring after said measured interval of time.

2. Means for controlling the access time for writing a next tape data block after completion of a prior adjacent data block comprising capstan control signal generating means, means for disabling said generating means in response to completion of said prior data block, means for measuring a short time interval from completion of said prior block, means for actuating a short time delay in response to a new write instruction provided during said short time interval, and means for actuating a long time delay in response to a new write instruction after said short time interval, the writing of the next block beginning after termination of one of said time delays.

3. Means as defined in claim 2 in which, said measuring means is a single-shot multivibrator, said first actuating means is an AND gate, and said second actuating means is an AND gate.

4. Means for controlling writing on tape as defined in claim 2 further comprising means for enabling said capstan control signal in response to initiating said short or long write delay.

5. Means for controlling writing on tape as defined in claim 4 further comprising means for inhibiting the long write delay after beginning a short write delay.

6. Means for controlling the size of an interrecord gap prior to writing a next tape data block after completion of a prior adjacent data block, comprising capstan go signal means, means for disabling said go signal means in response to completion of said prior data block, short interval means for measuring a short time interval upon completion of said prior block, means for initiating a short time delay and enabling said capstan go signal means in response to a new write instruction provided during said short time interval, long interval means for measuring a long time interval in response to completion of said prior block, and means for inhibiting said go signal means with an output from said long interval means after expiration of said short interval, means for actuating said go signal means after expiration of said long interval in response to a write instruction occurring after expiration of said short interval, and means for initiating a long time delay in response to said actuating means, whereby tape writing begins after expiration of a selected one of said short or long write delays.

References Cited

UNITED STATES PATENTS

| | | | |
|---|---|---|---|
| 2,907,989 | 10/1959 | Guerber ---------- | 340—174.1 |
| 3,193,801 | 7/1966 | Grondin ---------- | 340—174.1 |

BERNARD KONICK, *Primary Examiner.*

A. BERNARD, A. I. NEUSTADT, *Assistant Examiners.*